E. BAUSCH.
NOSE PIECE FOR MICROSCOPES.
APPLICATION FILED FEB. 14, 1908.
905,633.
Patented Dec. 1, 1908.
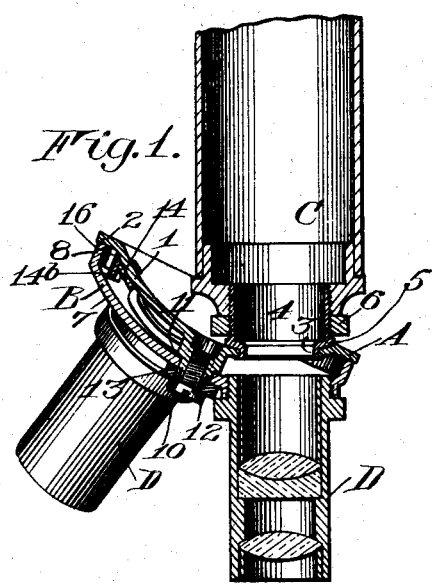
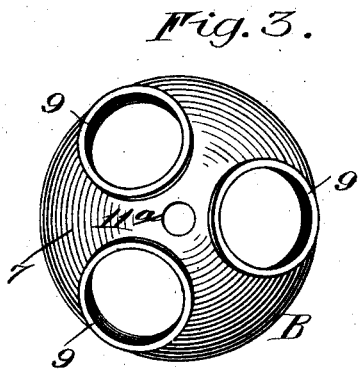
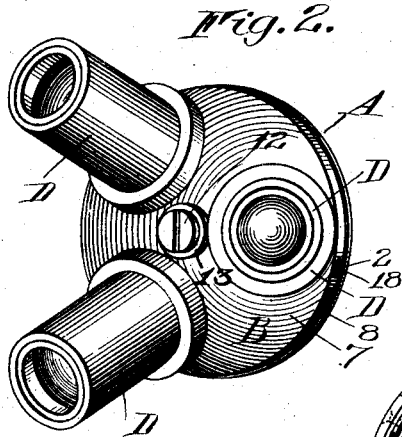
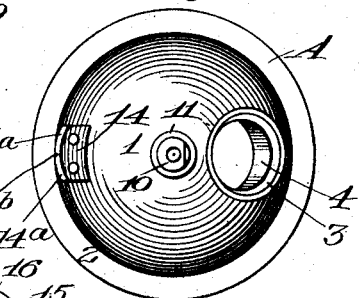
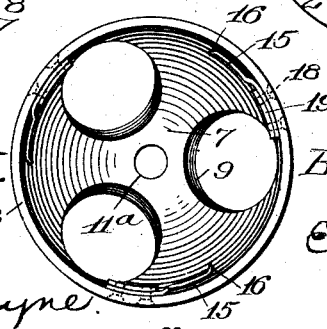
Witnesses
Walter B. Payne
Inventor
Edward Bausch
By
his Attorneys

UNITED STATES PATENT OFFICE.

EDWARD BAUSCH, OF ROCHESTER, NEW YORK, ASSIGNOR, BY MESNE ASSIGNMENTS, TO BAUSCH & LOMB OPTICAL COMPANY, (NO. 2,) A CORPORATION OF NEW YORK.

NOSE-PIECE FOR MICROSCOPES.

No. 905,633.   Specification of Letters Patent.   Patented Dec. 1, 1908.

Application filed February 14, 1908. Serial No. 415,829.

*To all whom it may concern:*

Be it known that I, EDWARD BAUSCH, of Rochester, in the county of Monroe and State of New York, have invented certain new and useful Improvements in Nose-Pieces for Microscopes; and I do hereby declare the following to be a full, clear, and exact description of the same, reference being had to the accompanying drawings, forming a part of the specification, and to the reference-numerals marked thereon.

The present invention, which relates to nose pieces for microscopes of the type in which any one of a plurality of objectives is adapted to be axially alined with a microscope or adapter tube, has for an object to provide a very light but strong construction which may be inexpensively manufactured from sheet metal by a few simple operations.

To these and other ends the invention consists in certain improvements and combinations of parts, all as will be hereinafter more fully described, the novel features being pointed out in the claims at the end of the specification.

In the drawings: Figure 1 is a longitudinal section through one end of a microscope embodying my invention. Fig. 2 is a view of the objective end of the same microscope. Fig. 3 is a bottom view of one of the members of the nose-piece. Fig. 4 is a sectional view of the same member; Fig. 5 is a top view of the same member; Fig. 6 is a detail sectional view of one of the spring fingers, and Fig. 7 is a top view of the other member of the nose-piece.

Similar reference numerals in the several figures indicate similar parts.

Nose pieces for microscopes as heretofore constructed, have been very expensive to manufacture, for the reason that their production has required skilled labor and has consumed a great deal of time, whereas by this invention it is possible to form them from sheet metal by stamping or pressing operations which consume very little time and do not require skilled labor. A further advantage of the device is that owing to the method of its manufacture, it has greater accuracy than those heretofore produced.

In the present embodiment of my invention there are employed two relatively rotatable members A and B, one of which is adapted to be attached to the microscope tube C and the other of which is adapted to carry a plurality of objectives.

The member A is formed with a central concavo convex portion 1 and an annular flange 2 projecting radially therefrom, the flange and the concavo convex portion being of uniform thickness. These parts, as will be apparent, are adapted to be made from a circular disk of sheet metal which may be pressed or stamped to provide the concavo convex portion. In order to secure the microscope or adapter tube C to the member A the latter is provided in its concavo convex portion with an eccentrically arranged perforation which may be formed by a punching operation, and in this opening is fitted a flange 3 projecting from a tube 4 which has an annular shoulder 5 abutting the concavo face, the flange being extended outwardly by spinning or other suitable method to engage the convex face. The adapter tube C is interlocked with tube 4 in any suitable manner, but preferably by engaging external threads on the latter, a nut 6 serving to lock the adapter C against movement.

The member B also is formed with a concavo convex portion 7 and from the periphery of this portion on the concave side projects a laterally extending annular flange 8, this flange and the portion 7 being of uniform thickness throughout, thus making it possible also to form these parts from sheet metal by a single stamping operation. For securing the objective tubes D to the nose-piece this member B is formed with a plurality of flanges 9 which are eccentrically arranged in equidistant relation on the convex face so as to project in the direction of the said face and are of the same thickness as the concavo convex portion, their inner walls alining with the walls of openings which they surround. These flanges, it will be noted, may be formed by first punching the concavo convex portion and then pressing outwardly the metal about the openings. Their inner walls are then provided with screw threads to receive threaded portions of the objective tubes D.

When the members A and B are fitted together the laterally extending flange 8 abuts one face of the flange 2 near its periphery so that the outer face of the first mentioned flange is substantially flush with the periphery of the last mentioned flange, thus providing a joint which will exclude dust. The members are rotatably secured in this relation by a stud which preferably projects from the member A so as not to interfere with the operation of the fastening device to be described. The stud may be formed by pressing or stamping the central portion of the member A to provide a closed boss and then compressing the boss laterally and longitudinally, the upper portion 10 being compressed to a greater degree in order to form a shoulder 11 for abutment by member B and a thickened closed end which is perforated and provided internally with screw threads. This reduced portion 10 of the stud passes through an opening 11ª arranged in the center of the concavo convex portion 7 of member B and is engaged by a screw fastener 12, a washer 13 being interlocked with the reduced portion on the outside of member B in order to prevent the relative relation of the members A and B affecting the adjustment of the screw.

An indicating means may be employed for determining when the different objectives are optically alined with the microscope or adapter tube and for this purpose I provide a device in the form of a plate 14 depending from the concavo convex portion 1 of member A, having inclined or beveled portions 14ª at each end and formed with a notch 14ᵇ between its ends. Coöperating with this plate is a plurality of spring fingers 15 secured to the inner face of the flange of member B near each objective and having an inwardly deflected end 16. When the parts are rotated relatively to each other the ends 16 ride on plate 14 as the latter passes them and when any one of the objectives is alined with the adapter tube the end enters the notch 14ᵇ and holds the parts against accidental rotation. In order that the spring finger may be positioned properly, so that the optical alinement can be secured, it is adjustably mounted on member B and for this purpose is provided with two slots 17 in which work the screw-bolts 18 engaging a clamping plate 19. With this form of indicating means, the parts are housed so that they will be protected from blows and dust, thus preventing them becoming ineffective and the proper optical alinement of the parts is assured.

Assuming the parts are in the position shown in Fig. 1 and it is desired to change an objective, one of the objective tubes is grasped and the members A and B relatively rotated until a suitable objective is alined with the tube of the microscope, the indicating means being employed to determine the alinement.

From the foregoing it will be apparent that I have provided a nose-piece of light and strong construction which has accuracy and can be manufactured cheaply from sheet metal.

I claim as my invention:

1. A nose piece for microscopes comprising two relatively rotatable members, one of which has a central concavo convex portion and a radially extending flange surrounding the latter, the flange and the concavo convex portion being of uniform thickness, and the latter being provided with an eccentrically arranged opening and a tube secured within the opening, and the other of which has a concavo convex portion, a flange projecting laterally from the periphery of its concave face, and means for securing a plurality of objectives to the convex face, said concavo convex portion and the laterally extending flange being of uniform thickness.

2. A nose piece for microscopes comprising two relatively rotatable members, one of which carries means for securing a plurality of objectives thereto, and the other of which embodies a central concavo convex portion and an annular flange projecting radially therefrom, the flange and the concavo convex portion being of uniform thickness and the latter being provided with an eccentric opening, and a tube having a shoulder thereon abutting the concave face about the opening and a flange extending through the opening and bent outwardly to engage the convex face.

3. A nose piece for microscopes comprising a pair of relatively rotatable members, one of which carries means for securing a microscope tube thereto, and the other of which is formed with a central concavo convex portion, a plurality of openings, a flange extending laterally from the concave face into engagement with the other member and a plurality of annular internally threaded flanges projecting from the convex face, about the openings in the latter, the walls of the openings and the inner walls of the flanges being in alinement and the concavo convex portion, the laterally extending flange and the plurality of annular flanges being of uniform thickness.

4. A nose piece for microscopes comprising a member having means for securing a microscope tube thereto, a member having means for securing a plurality of objectives thereto, said members being formed of metal of uniform thickness, and one being formed with a central pressed up boss compressed longitudinally and transversely and provided with a screw opening, and a screw fastener engaging said boss to hold the members together.

5. A nose piece for microscopes comprising a member having means for securing a microscope tube thereto, a member having means for securing a plurality of objectives thereto, one of said members being formed from metal of uniform thickness and being provided with a central opening, and the other being formed with a central pressed up boss compressed longitudinally and transversely and having an end portion compressed to a greater degree to provide a shoulder, said end portion projecting through the central opening in the other member and having an opening the walls of which formed with screw threads, and a screw fastener holding the members together by engagement with the screw threads in the boss.

6. A nose piece for microscopes comprising a member having means for securing a microscope tube thereto, a relatively rotatable member having means for securing a plurality of objectives thereto, a device carried by one of said members, and housed between the members, and a plurality of devices carried by the other member, housed between the members and coöperating with the first named device for alining the microscope tube with the objectives.

7. A nose piece for microscopes comprising a member having means for securing a microscope tube thereto, a relatively rotatable member having means for securing a plurality of objectives thereto, a plate secured to one of said members and having inclined ends and a notch between its ends, and a plurality of spring fingers carried by the other member and having ends adapted to ride on the inclined ends and to enter the notch.

8. A nose piece for microscopes comprising a member having means for securing a microscope tube thereto, a relatively rotatable member having means for securing a plurality of objectives thereto, a stop carried by one of said members, and a plurality of adjustable stops carried by the other member to coöperate with the first mentioned stop.

9. A nose piece for microscopes comprising a member having means for securing a microscope tube thereto, a relatively rotatable member having means for securing a plurality of objectives thereto, a notched stop on one of said members, a plurality of spring fingers carried by the other member adjustable relatively to each other.

EDWARD BAUSCH.

Witnesses:
WM. DRESCHER,
LOUIS M. POTTER.